May 5, 1959     R. C. MOTT     2,885,178
VALVE ASSEMBLY FOR CONTROL APPARATUS
Filed Feb. 11, 1954     2 Sheets-Sheet 1
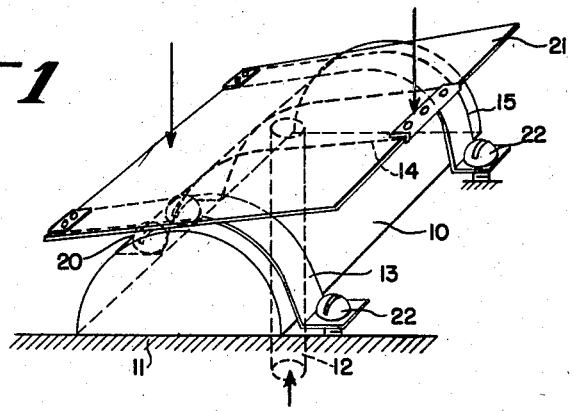
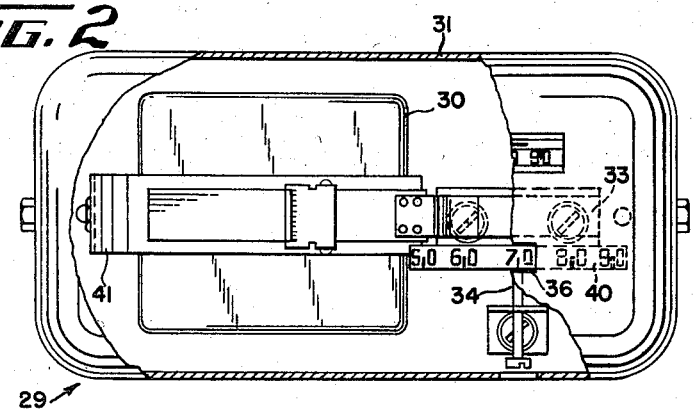
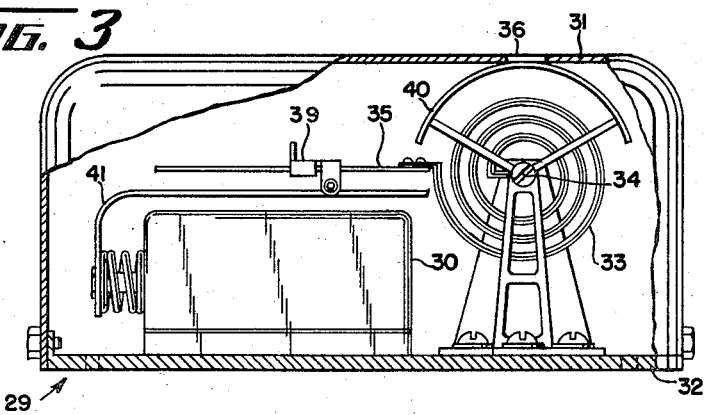
INVENTOR.
RICHARD C. MOTT
BY George H. Fisher
ATTORNEY May 5, 1959 R. C. MOTT 2,885,178
VALVE ASSEMBLY FOR CONTROL APPARATUS
Filed Feb. 11, 1954 2 Sheets-Sheet 2
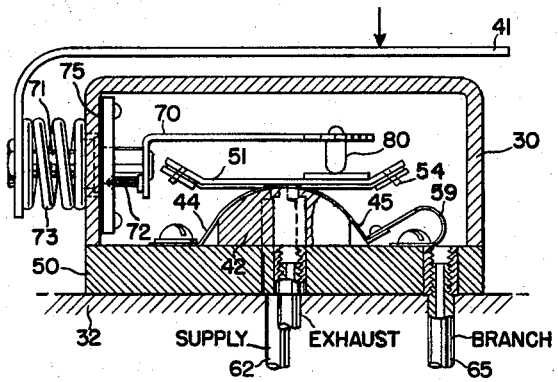
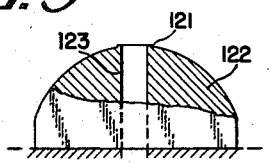
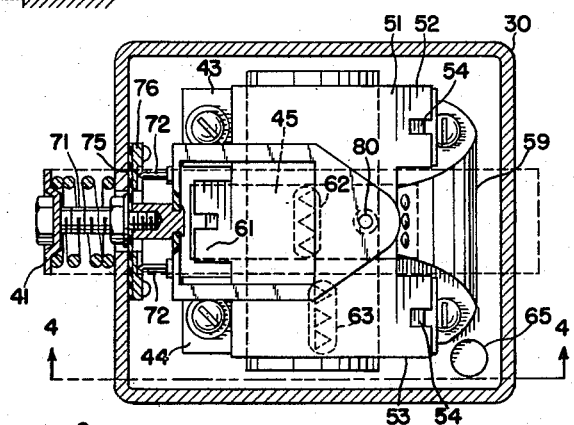
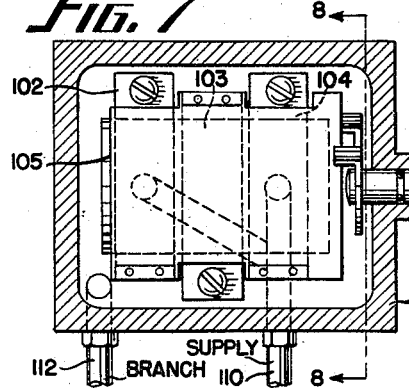
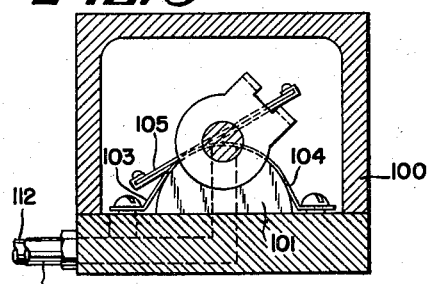
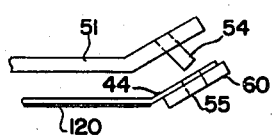
INVENTOR.
RICHARD C. MOTT
BY George H Fisher
ATTORNEY United States Patent Office 2,885,178
Patented May 5, 1959

2,885,178

VALVE ASSEMBLY FOR CONTROL APPARATUS

Richard C. Mott, Chicago, Ill., assignor to Minneapolis-Honeywell Regulator Company, Minneapolis, Minn., a corporation of Delaware Application February 11, 1954, Serial No. 409,745

3 Claims. (Cl. 251—303)

The present invention is concerned with an improved control apparatus; in particular, an improved valve apparatus having an operating force which is largely independent of the pressure of the source being controlled.

In control apparatus, especially pneumatic condition controlling apparatus, there is a need for valve apparatus requiring low operating forces. Such valve apparatus is normally controlled by a condition responsive device to control the air pressure in a branch line leading to condition changing devices such as radiators. The present invention is concerned with an improved valve apparatus which requires small operating forces and is readily adapted to low power sensing elements, the operating forces being independent of the pressure variations in the supply source.

In particular, the present valve apparatus comprises a tensioned flexible tape or band which engages a curved seat member. The tape is connected to an operator rockable about the seat member; so that, when the operator is rocked in a closing direction the tape is wrapped on the seat member closing off a passage from a source under pressure.

It is therefore an object of the present invention to provide an improved valve apparatus requiring very small operating forces.

Another object of the present invention is to provide an improved control apparatus operable in response to a condition and adapted to control a condition changing device and wherein the force required by the control apparatus is relatively small.

Still another object of the present invention is to provide an improved valve apparatus including a plurality of tape-like flexible members engaging a partially cylindrical seating member, at least one of the flexible members being arranged to control the flow of a medium from a passage in the seating member.

Other objects of the invention will be apparent from a consideration of the accompanying specification, claims, and drawings of which:

Figure 1 is a schematic view of the valve apparatus;

Figure 2 is a plan view of one embodiment of my invention, with parts removed, in which the valve apparatus is operated in response to a temperature responsive device;

Figure 3 is a side elevation view of the apparatus shown in Fig. 2;

Figure 4 is a side vertical section view of the valve apparatus shown in the control device of Figures 2 and 3, the valve apparatus being generally of the type schematically shown in Figure 1;

Figure 5 is a horizontal sectional view of the valve apparatus shown in Figure 4;

Figure 6 discloses the method of connecting a tape to an operator of the valve apparatus shown in Figure 4;

Figure 7 is another embodiment of the invention shown in horizontal section, this example being manually operable;

Figure 8 is a vertical section view of valve apparatus shown in Figure 7;

Figure 9 is one particular type of valve seat for use in valve apparatus generally of the type as shown in Figure 1.

Referring to Figure 1, the present valve apparatus basically includes a semi-cylindrical seat member 10 mounted on a base 11 with a passage 12 extending through the base and cylindrical member and terminating at the surface of 10 midway between the ends of the member 10. The passage is controlled by one of a plurality of flexible tapes or bands 13, 14 and 15 extending in a contacting relation around a portion of the curved surface of member 10. Tape 14 is connected at one extremity by a pair of screws 20 to base member 11 adjacent one side of member 10 and its other extremity is connected to the middle of one side of a plate or operating member 21. The plate 21 is rockable on the curved surface of member 10 in a teeter-totter fashion; so that, as it is rocked in a clockwise direction about member 10, more of tape 14 engages member 10 and closes off passage 12. Tapes 13 and 15 are connected near opposite extremities of plate 21 on a side opposite the connection to tape 14 and extend in the opposite direction about the cylindrical surface of member 10. Tapes 13 and 15 are connected to base member 11, on the side of member 10 opposite the connection of tape 14, by screws 22. The tension on the tapes 13 and 15 as well as the tension of tape 14 can be adjusted by drawing the ends of tapes 13 and 15 closer to base 11 by the screws or the tensioning may be accomplished by tightening tape 14.

Upon the application of a force to either side of plate 21, the plate will teeter about member 10 to either wrap tape 14 on member 10 and unwrap tapes 13 and 15, thereby closing passage 12, or unwrap tape 14 to open passage 12. The tension, as can be adjusted by screws 22 and obviously by screws 20 if so provided, should be sufficient to provide a sealing force between tape 14 and cylindrical member 10 adequate to seal off passage 12 against the maximum pressure to be developed in passage 12 from the source (not shown). This tension should be such that the unit force inwardly exerted by the tape exceeds the unit force exerted outwardly by the medium being controlled. The operating force necessary to rock the plate 21 about the cylindrical member 10 is then substantially independent of the pressure existing in passage 12.

Figures 2 and 3 show a practical embodiment of a control apparatus 29 incorporating a valve apparatus 30 generally of the type shown in Figure 1. In particular, thermostat 29 includes a case 31 attached to a mounting base 32, valve means 30 being attached to base 32 and operable by a bimetal 33. Spiral bimetal element 33 has one extremity connected to a shaft 34 and the other end connected to an arm 35. The calibration of the unit is accomplished by suitably rotating shaft 34. The temperature setting effected by adjustment of shaft 34 is indicated by a scale 40 carried by shaft 34 and viewed through an opening 36 in case 31. Movement of a slidable link 39 to the right on arm 35 tends to increase the effective length of lever arm 41 lessens the force requirement from the bimetal 33 to operate the valve unit 30, thus the operating differential of the unit is reduced. Obviously, movement in the opposite direction will have an opposite effect.

The valve unit 30, as shown in Figures 4 and 5, comprises a seat member 42 having a curved surface for receiving flexible tapes 43, 44 and 45 in a manner similar to that shown schematically in Figure 1. Tapes 43 and 44 are connected on one side of member 42 to a base 50 and extend adjacent the opposite ends of member 42 to connect to an operator or plate 51. The plate has a pair of ears 52 and 53 on one side having projections 54 bent downwardly to be received by a recess 55 in a member 60 attached to the end of the tapes as shown in Figure 6. Tape 45 is attached to a similar projection from an ear 61 on the plate opposite ears 52 and 53 and wraps in an opposite direction about member 42. It is attached to base member 50 by a curved leaf spring 59. Tension on the tapes 43, 44 and 45 is developed by the spring 59 which, although it is attached to tape 45, is resisted by tapes 43 and 44. With this arrangement, the tension of tape 45 is equal to the combined tensions of 43 and 44, but since tape 45 controls the supply of pressure fluid through port 62 and tape 44 controls an exhaust port 63, only the tension in 45 is critical. The exhaust port is controlled by tape 44. Air is exhausted from the space inside valve 30 through port 63 and its passage extending downward in member 42 and base 50 to the atmosphere. The ports 62 and 63 on the curved surface of member 42 are offset; so that, a predetermined position of operator 51, approximately as shown, results in closing both the supply and exhaust passages. A high degree of throttling is obtained with the ports substantially as shown. A branch passage 65 delivers air from the valve unit to suitable control apparatus such as heat furnishing means (not shown). The operation of the apparatus depends upon the pressure in branch passage 65.

Lever arm 41, which is the actuator for valve unit 30, is connected to a pivotally supported arm 70 inside the valve unit by a rod 71. Arm 70 pivots about projections 72 extending against a suitable bearing plate 76 attached to the inside wall of the valve unit 30. A spring 73 which is mounted about shaft 71 between lever arm 41 and the casing of the valve unit holds projections 72 in their associated recesses and tends to rotate levers 41 and 70 counter-clockwise because the line of force due to spring 73 is above pivots 72. A seal off diaphragm 75 is also connected to shaft 71 and the valve unit. This diaphragm provides for a feedback or rebalance force when a pressure is developed inside the valve unit. The amount of rebalance force depends upon the distance between the center of the diaphragm, which is the center of shaft 71, and the axis of the pivots or projections 72. Upon decreasing this spacing, the effective area of the diaphragm on both sides of the axis of pivot approaches equality, thus the rebalance force approaches zero. Arm 70 has a projection 80 engaging plate 51; so that, as a force is applied to the upward side of lever arm 41, a downward motion of projection 80 results in a teetering of the plate 51 about member 42 to open the supply passage and close the exhaust passage. The force on arm 41 is supplied, for instance, by the bimetal element 33 as shown in Figures 2 and 3.

Referring to Figures 3, 4 and 5, assume that bimetal 33 increases in temperature and applies a downward force on lever arm 41, thus rotating shaft 71 and arm 70 as an assembly about the pivotal axis of projections 72. Plate 51 would then be rocked about member 42 in a direction to open the supply passage 62 and close the exhaust passage 63, thereby increasing the branch pressure to operate, as an example, a heat furnishing means. Upon the increase in the branch pressure, the pressure will be applied to the diaphragm 75, and as the axis of projections 72 does not coincide with shaft 71, a force is developed by the diaphragm 75 opposing the force on arm 41 tending to rebalance the apparatus.

The force developed by spring 59 is sufficient to hold tape 45 against the supply port to maintain an adequate seal off at the maximum supply pressure, and once this tension is adjusted, the forces required to operate the valve unit 30 are largely independent of the pressure in supply passage 62. This has an advantage over the conventional valve unit as there are no variations in the control of the temperature, in this particular case, due to changing force requirements when the supply of pressure varies through the range below the maximum pressure.

A second embodiment of the valve unit is shown in Figures 7 and 8 in which a body 100 contains a seat member 101 engaged by a plurality of flexible tapes 102, 103 and 104 that are connected to the body base and the operating member or plate 105 in a manner similar to the valve units of Figure 1 and Figure 4. A supply passage 110 is connected to a source of medium such as steam or hot water and extends through the base of the body and seat member 101. Upon the rotation of member 105, by a manual operator 111 connected thereto, tapes 102 and 104 engage seat member 101 to close off supply passage 110. A branch or feed line 112 is connected to body 100 to deliver the medium from the supply passage when the valve is open.

While plain metallic tapes are normally used, a coating of a material such as Teflon can be placed on the underside of the tape, as shown in Figure 6. The tape 44 has a coating 120. This coating not only provides for a better sealing of the passage but protects the tape from small particles of scale or foreign material that might be blown up through the supply line, especially where the valve unit is used with steam at high pressures.

A small rim or raised portion 121 as shown in Figure 9 on seat member 122 provides an improved seal off of passage 123 when a tape is held against the member 122. Such a raised portion is used with metallic tapes alone as well as tapes containing a coating. The need of such depends on the particular application of the apparatus.

Attention is again directed to the fact that at least the tape controlling the pressure fluid is tensioned sufficiently to develop an inward unit pressure exceeding the unit pressure of the fluid being controlled the degree of tension insuring complete shut-off of fluid when the valve is so operated. The pressure fluid cannot change the tension in the tapes because its force is always less than the existing force of the tape. Variations in pressure of the pressure fluid have no effect on the operating force of the valve. Obviously, the spring forces are easily balanced out, and the internal friction of the tapes and the rolling friction of the plate 51 or 103 are very small.

While I have shown specific forms of control apparatus using a particular valve apparatus, it is to be understood that this is for illustrative purposes only and that the invention is to be limited solely by the scope of the appended claims.

I claim as my invention:

1. Valve apparatus comprising, a convexly curved valve seating member, a valve operating member, said valve operating member being positioned for rocking engagement upon the curved seating member as a fulcrum, a flow passage in said seating member, a flexible tape attached to a first side of said seating member and a first side of said operating member, said sides being oppositely disposed with respect to said fulcrum so that when said operating member rocks to a valve closing position said tape wraps onto said seating member to close said flow passage, said seating member having a second side oppositely disposed to the first side of said seating member with respect to said fulcrum and said operating member having a second side correspondingly disposed to the first side of same, a pair of flexible tapes spaced on opposite sides of said first mentioned tape, each of said pair of flexible tapes being connected to said second sides so that when said operating member is moved to a valve open position said pair of tapes wrap onto said seating member and said first mentioned tape uncovers said flow passage, and means for placing a tension on said tapes.

2. Valve apparatus comprising, a valve seating member, a valve operating member, one of said members having a curved surface, said valve operating member being positioned for rocking engagement upon said seating member, a flow passage in said seating member, a flexible tape attached to a first side of said seating member and a first side of said operating member, said sides being oppositely disposed with respect to the point of said engagement so that when said operating member rocks to a valve closing position said tape contacts said seating member to close said flow passage, said seating member having a second side oppositely disposed to the first side of said seating member with respect to said point of engagement and said operating member having a second side correspondingly disposed to the first side of said operating member, a pair of flexible tapes spaced on opposite sides of said first mentioned tape, each of said pair of flexible tapes being connected to said second sides so that when said operating member is moved to a valve open position said pair of tapes contact said seating member and said first mentioned tape uncovers said flow passage, and means for placing a tension on said tapes.

3. Valve apparatus comprising, a convexly curved valve seating member, a valve operating member, said valve operating member being positioned for rocking engagement upon the curved seating member as a fulcrum, a flow passage in said seating member, a flexible tape attached to a first side of said seating member and a first side of said operating member, said sides being oppositely disposed with respect to said fulcrum so that when said operating member rocks to a valve closing position said tape wraps onto said seating member to close said flow passage, said seating member having a second side oppositely disposed to the first side of said seating member with respect to said fulcrum and said operating member having a second side correspondingly disposed to the first side of same, a pair of flexible members spaced on opposite sides of said tape, each of said flexible members being connected to said second sides so that when said operating member is moved to a valve open position said flexible members wrap onto said seating member and said first mentioned tape uncovers said flow passage, and means for placing a tension on said tape.

References Cited in the file of this patent

UNITED STATES PATENTS

| | | |
|---|---|---|
| 19,203 | Osgood | Jan. 26, 1858 |
| 212,556 | Johnson | Feb. 25, 1879 |
| 261,483 | Richardson | July 18, 1882 |
| 1,104,867 | Blohut | July 28, 1914 |
| 1,787,304 | Becker | Dec. 30, 1930 |
| 2,223,712 | Ziebolz | Dec. 3, 1940 |
| 2,354,619 | Smith | July 25, 1944 |
| 2,481,395 | Carns | Sept. 6, 1949 |
| 2,484,000 | Macgeorge | Oct. 4, 1949 |
| 2,675,025 | Wynkoop | Apr. 13, 1954 |
| 2,741,453 | Hayes | Apr. 10, 1956 |

FOREIGN PATENTS

| | | |
|---|---|---|
| 536,543 | Great Britain | May 19, 1941 |